United States Patent
Tsuruhara

[19]

[11] Patent Number: 6,160,332
[45] Date of Patent: Dec. 12, 2000

[54] LIQUID COOLED BRUSHLESS GENERATOR FOR VEHICLES

[75] Inventor: Kenji Tsuruhara, Tokyo, Japan

[73] Assignee: Mitsubishi Denki Kabushiki Kaisha, Tokyo, Japan

[21] Appl. No.: 09/349,362

[22] Filed: Jul. 8, 1999

[30] Foreign Application Priority Data

Jan. 13, 1999 [JP] Japan .................................. 11-007071

[51] Int. Cl.⁷ .................................................. H02K 9/00
[52] U.S. Cl. .................................. 310/54; 310/58; 310/64
[58] Field of Search .................................. 310/54, 68 D, 310/52, 58, 64; 123/41.31

[56] References Cited

U.S. PATENT DOCUMENTS

| | | | |
|---|---|---|---|
| 4,221,982 | 9/1980 | Raver et al. | 310/59 |
| 4,739,204 | 4/1988 | Kitamura | 310/68 D |
| 4,963,776 | 10/1990 | Kitamura | 310/64 |
| 4,980,588 | 12/1990 | Ogawa | 310/68 D |
| 5,019,733 | 5/1991 | Kano et al. | 310/61 |
| 5,095,235 | 3/1992 | Kitamura | 310/68 D |
| 5,293,089 | 3/1994 | Frister | 310/54 |
| 5,296,770 | 3/1994 | Pflueger et al. | 310/114 |
| 5,798,586 | 8/1998 | Adachi | 310/54 |
| 5,836,270 | 11/1998 | Aoki et al. | 123/41.31 |
| 5,925,751 | 9/1999 | Yamakoshi et al. | 310/89 |
| 5,971,291 | 10/1999 | Moroi et al. | 237/12.3 R |

FOREIGN PATENT DOCUMENTS

| | | |
|---|---|---|
| 2 711 281 A1 | 4/1995 | France . |
| 19630658 A1 | 5/1998 | Germany . |
| 04004736 | 1/1992 | Japan . |
| 4-67429 | 10/1992 | Japan . |
| 468850 | 11/1992 | Japan . |
| 07163090 | 6/1995 | Japan . |

*Primary Examiner*—Nestor Ramirez
*Assistant Examiner*—Joseph Waks
*Attorney, Agent, or Firm*—Sughrue, Mion, Zinn, Macpeak & Seas, PLLC

[57] ABSTRACT

In order to simplify the structure of a cooling function section utilizing a cooling fluid, a front bracket and a bowl-shaped rear bracket having a flange portion projecting outward from its opening portion are joined in a format resembling hands closed in prayer to form a parts housing chamber, and an airtight cooling chamber utilizing the cooling fluid is formed between the rear bracket and the cooling cover by placing an opening portion of the cooling cover and the flange portion of the rear bracket one upon the other.

18 Claims, 4 Drawing Sheets

LIQUID COOLED BRUSHLESS GENERATOR FOR VEHICLES

BACKGROUND OF THE INVENTION

1. Field of the Invention

The present invention relates to a vehicle brushless AC generator with cooling function by cooling liquid.

2. Description of the Prior Art

Figure 5:
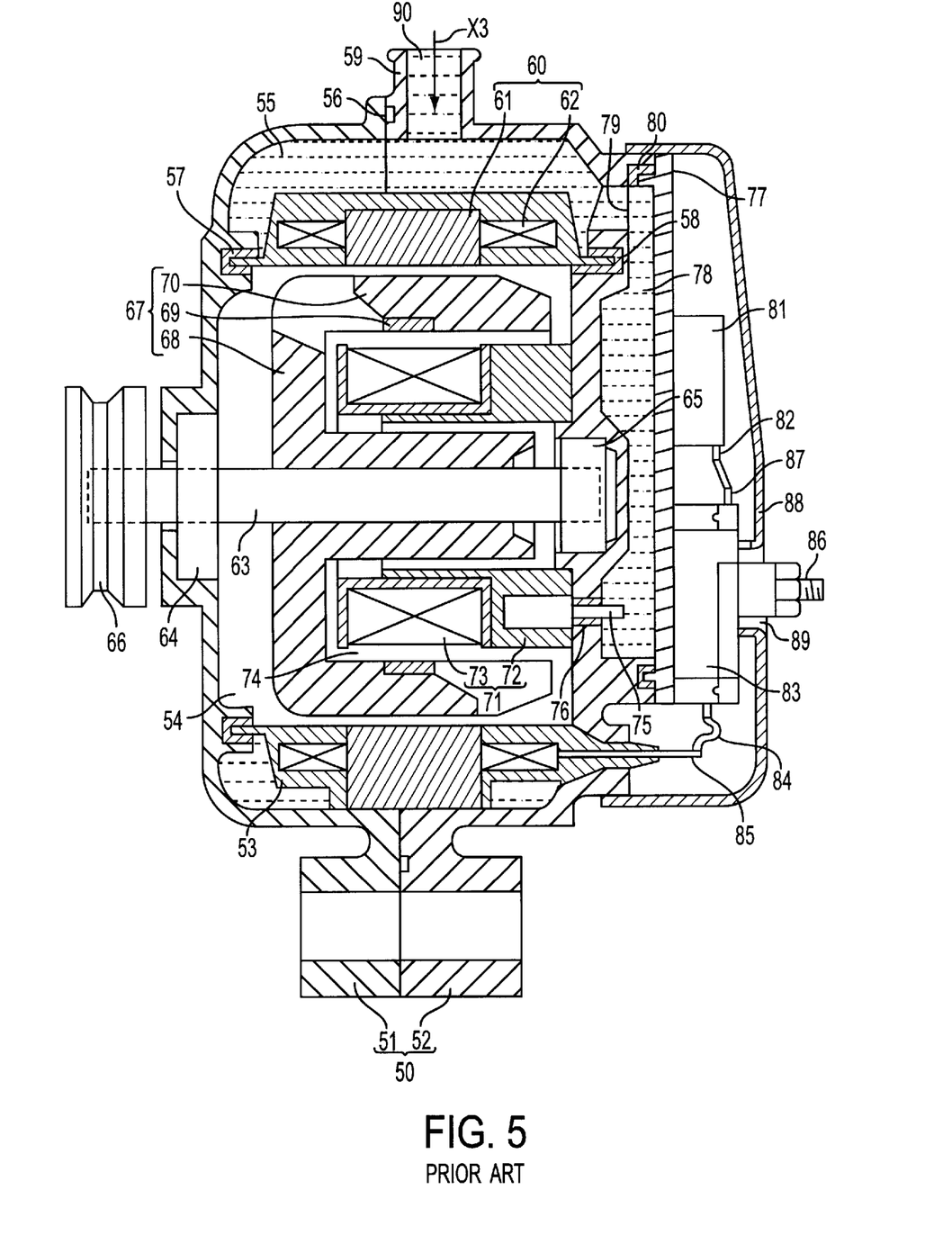
FIG. 5 is a cross-sectional view showing a conventional AC generator.

FIG. 5 is a sectional view of a vehicle brushless AC generator disclosed in Japanese Published Patent Application No. Hei 4-68850. In FIG. 5, reference numeral 50 denotes a generator case consisting of a bowl-shaped front bracket 51, a bowl-shaped rear bracket 52 and a cylindrical housing 53 which are joined to separate an inner parts housing chamber 54 from an outer first cooling chamber 55. Reference numeral 56 denotes an o-ring-like sealing member disposed at a joint portion between the front bracket 51 and the rear bracket 52. Numeral 57 is a gasket disposed at a fitting portion between the front bracket 51 and the housing 53. Numeral 58 is a gasket disposed at a fitting portion between the rear bracket 52 and the housing 53. Numeral 59 is an inlet portion provided on the rear bracket 52. Numeral 60 is a cylindrical stator consisting of a stator magnetic pole 61 and a stator coil 62, secured to the housing 53. Numeral 63 is a generator shaft rotatably mounted on the center portions of the front bracket 51 and the rear bracket 52 through a front bearing 64 and a rear bearing 65. Denoted by 66 is a pulley secured to the generator shaft 63 projecting forward from the front bracket 51, adapted to rotate with the shaft 63. Numeral 67 is a rotating magnetic pole. It is provided with a first rotating magnetic pole 68 secured to the generator shaft 63 to rotate therewith in the parts housing chamber 54 and a second rotating magnetic pole 70 secured to a peripheral portion of the first magnetic pole 68 through a supporting ring 69. Numeral 71 is an exciter consisting of an exciting magnetic pole 72 secured to the rear bracket 52 and an exciting coil 73 mounted on the exciting magnetic pole 72. It is housed in a cylindrical housing portion 74 formed in the rotating magnetic pole 67. An air gap is respectively formed between the stator 60, the rotating magnetic pole 67 and the exciter 71. Numeral 75 is a heat conductor provided to radiate the heat from the exciter 71 and disposed to pass through the rear bracket 52. Numeral 76 is a sealant disposed at a portion where the heat conductor 75 passes through the rear bracket 52. Numeral 77 is a plate-shaped cooling cover secured to the rear bracket 52 to form a second cooling chamber 78 between itself and the back face of the rear bracket 52. Numeral 79 is a communication passage formed on the rear bracket 52 to allow the first cooling chamber 55 to communicate with the second cooling chamber 78. Numeral 80 is a gasket disposed at a fitting portion between the rear bracket 52 and the cooling cover 77. Numeral 81 denotes a voltage regulator secured to the back face of the cooling cover 77; numeral 82 a voltage regulator terminal; numeral 83 a rectifier secured to the back face of the cooling cover 77; numeral 84 a rectifier terminal; numeral 85 a stator terminal projecting outward from the housing 53 to be connected to the rectifier terminal 84; numeral 86 an outer terminal provided near the rectifier 83; and numeral 87 a connector for the outer terminal 86, connecting to the voltage regulator terminal 82. Numeral 88 is a protective cover secured to the rear bracket 52 to cover the cooling cover 77, the voltage regulator 81, the voltage regulator terminal 82, the rectifier 83, the rectifier terminal 84, the stator terminal 85, and the connector 87, respectively. Numeral 89 is an opening formed on the protective cover 88 to allow the outer terminal 86 to project from the protective cover 88. Numeral 90 denotes a cooling fluid.

A description is subsequently given of the generating operation of the conventional vehicle AC generator when it is mounted on an automobile. The vehicle brushless AC generator is first installed outside a cylinder block of an engine, then a ring-shaped belt is stretched between a pulley provided on a crankshaft of the engine and the pulley 66 of the AC generator, and electric wiring is installed between the outer terminal 86 and a battery of the automobile. In such a condition, when a driver turns on an ignition switch of the automobile, a current runs from the battery of the automobile to an ignition coil to start the engine. At the same time, an exciting current runs through the voltage regulator 81 from the battery to the exciting coil 73 to make a magnetic circuit between the stator magnetic pole 61, the rotating magnetic pole 67 and the exciting magnetic pole 72. When the generator shaft 63 is turned by starting the engine to rotate the rotating magnetic pole 67, the first rotating magnetic pole 68 and the second rotating magnetic pole 70 cross the stator magnetic pole 61 alternately to allow alternating magnetic flux to pass through the stator coil 62, thereby generating 3-phase AC induced electromotive force in the stator coil 62. The voltage of this induced electromotive force (EMS) is first regulated by the voltage regulator 81 and this EMS is then rectified by the rectifier 83 and charged into the battery through wiring (not shown here) from the outer terminal 86.

Next, the cooling operation of the conventional AC generator mounted on the automobile is explained. The vehicle brushless AC generator is mounted on the engine, and the inlet portion 59 and an outlet portion (not shown) are connected through wiring (not shown) to an engine cooling system. After the AC generator starts the generating operation after the engine is started, a water pump of the engine cooling system is driven to circulate the cooling fluid when the temperature of the engine rises over a predetermined temperature. In such a condition, the cooling fluid 90 shown by a dotted line moves as shown by an arrow X through the inlet portion 59 to the first cooling chamber 55 and through the communication passage 79 to the second cooling chamber 78 in sequence. In the first cooling chamber 55 and the second cooling chamber 78, the heat generated from parts such as the stator 60, the exciter 71, the voltage regulator 81 and the rectifier 83 by the generating operation is absorbed by the cooling fluid 90 as a result of heat exchange action with the cooling fluid 90. The cooling fluid 90 that has absorbed the heat is then returned through the outlet portion to the engine cooling system. (A structure similar to this cooling system is disclosed in FIG. 12 of Laid-Open Japanese Patent Application No. Hei 8-130854).

However, in the conventional AC generator stated above, the first cooling chamber 55 is formed in a manner completely separated from the parts housing chamber 54 by the three independent parts of the front bracket 51, the rear bracket 52 and the cylindrical housing 53. On the other hand, the second cooling chamber 78 is also formed outside the generator case 50 by the two independent parts of the rear bracket 52 and the cooling cover 77. As a result, there is a problem in that the section where is responsible for the cooling function by the cooling fluid 90 has a complicated structure.

SUMMARY OF THE INVENTION

It is therefore an object of the present invention to provide a vehicle brushless AC generator which can simplify the structure of a cooling function section utilizing the cooling fluid.

According to of the present invention, there is provided a vehicle brushless AC generator having a cooling function utilizing a cooling fluid, comprising a front bracket, a bowl-shaped rear bracket having a flange portion projecting outward from its opening portion, a parts housing chamber formed by joining the front bracket with the rear bracket in a format resembling hands clasped in prayer and adapted to house generating parts consisting of a generator shaft, a stator, a rotating magnetic pole and an exciter, a bowl-shaped cooling cover disposed to cover the rear bracket in the same direction as the rear bracket, wherein an airtight cooling chamber for the cooling fluid is formed between the rear bracket and the cooling cover by placing an opening portion of the cooling cover and the flange portion of the rear bracket one upon the other.

According to of the present invention, there is provided a vehicle brushless AC generator, wherein the front bracket is provided with a circular groove adapted to engage with the flange portion of the rear bracket.

According to of the present invention, a vehicle brushless AC generator is provided in which the cooling cover is provided with a flange portion projecting outward from its opening portion, a sealing member according to claim 1 is disposed at a joint face where the flange portion of the cooling cover and the flange portion of the rear bracket are placed one upon the other, and said plurality of flanges and the front bracket are connected with each other by a fastening member outside the sealing member.

According to of the present invention, there is provided a vehicle brushless AC generator in which the front bracket is provided with a circular adapted to engage with the flange portion of the rear bracket and the flange portion of the cooling cover.

According to the present invention, there is provided a vehicle brushless AC generator in which the front bracket, the rear bracket and the cooling cover are formed from a good heat-conducting material.

According to the present invention, there is provided a vehicle brushless AC generator in which the stator is supported through a good heat-conducting electrical insulating material on the rear bracket.

According to the present invention, there is provided a vehicle brushless AC generator in which the electrical insulating material is filled and set in a gap formed between the stator and the rear bracket.

According to the present invention, there is provided a vehicle brushless AC generator in which the front bracket has a filler opening through which the electrical insulating material is filled and set in a gap formed between the front bracket, the rear bracket and the stator.

According to of the present invention, there is provided a vehicle brushless AC generator in which a voltage regulator is secured through a good heat-conducting sheet to a surface of the cooling chamber opposite the cooling chamber.

According to the present invention, there is provided a vehicle brushless AC generator in which a rectifier is secured through a good heat-conducting sheet to a surface of the cooling chamber opposite the cooling chamber.

According to of the present invention, there is provided a vehicle brushless AC generator in which the exciter is secured to the rear bracket by a good heat-conducting fastening member.

According to the present invention, there is provided a vehicle brushless AC generator in which a part of the fastening member is exposed to the cooling chamber.

According to the present invention, there is provided a vehicle brushless AC generator in which a cooling fin is provided on a cooling chamber side of the rear bracket.

According to the present invention, there is provided a vehicle brushless AC generator in which the cooling fin is circularly formed along the peripheral direction of the rear bracket.

According to the present invention, there is provided a vehicle brushless AC generator in which a cooling fin is provided on a cooling chamber side of the cooling cover.

According to the present invention, there is provided a vehicle brushless AC generator in which the cooling fin is provided to correspond to the rectifier secured to a surface of the cooling cover opposite the cooling chamber.

According to the present invention, there is provided a vehicle brushless AC generator in which the cooling fin is provided to correspond to the voltage regulator secured to a surface of the cooling cover opposite the cooling chamber.

According to the present invention, there is provided a vehicle brushless AC generator in which the cooling cover is provided on the same side with an inlet portion for introducing the cooling fluid into the cooling chamber and an outlet portion for discharging the cooling fluid from the cooling chamber, respectively.

According to the present invention, there is provided a vehicle brushless AC generator in which the cooling chamber is connected to a different cooling system from an engine cooling system of a vehicle, having at least a tank and a radiator.

The above and other objects, features and advantages of the present invention will become more apparent from the following description when taken in conjunction with the accompanying drawings.

DETAILED DESCRIPTION OF THE PREFERRED EMBODIMENTS

1$^{st}$ Embodiment

Figure 1:
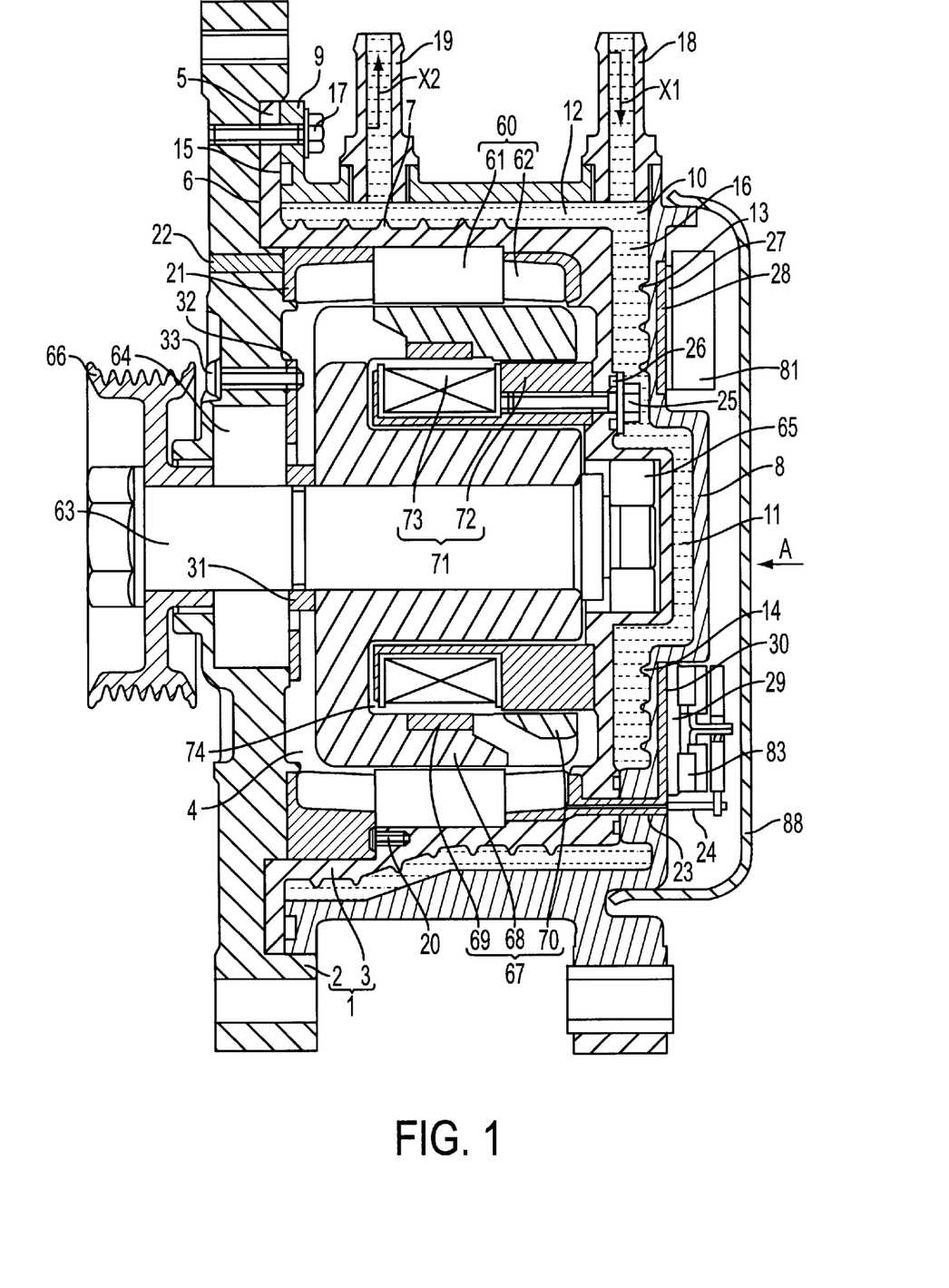
FIG. 1 is a cross-sectional view showing a first embodiment of an AC generator according to the present invention.
Figure 2:
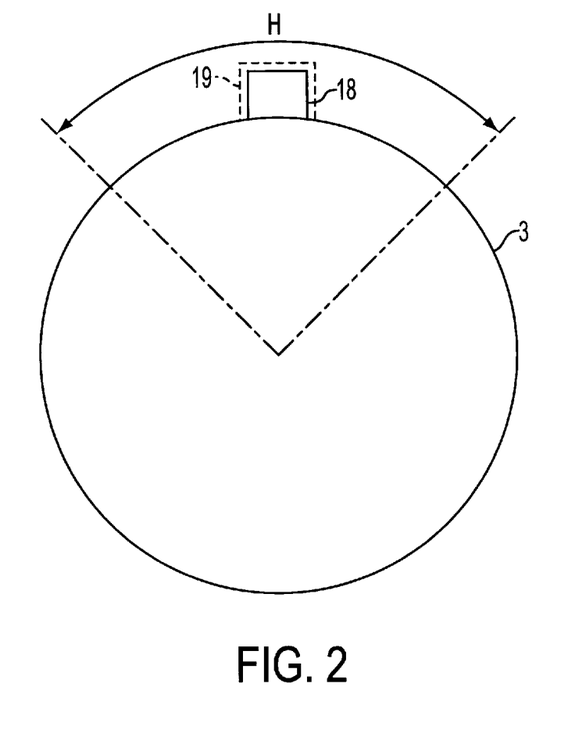
FIG. 2 is a rear view taken in the direction of the arrow A in FIG. 1.
Figure 3:
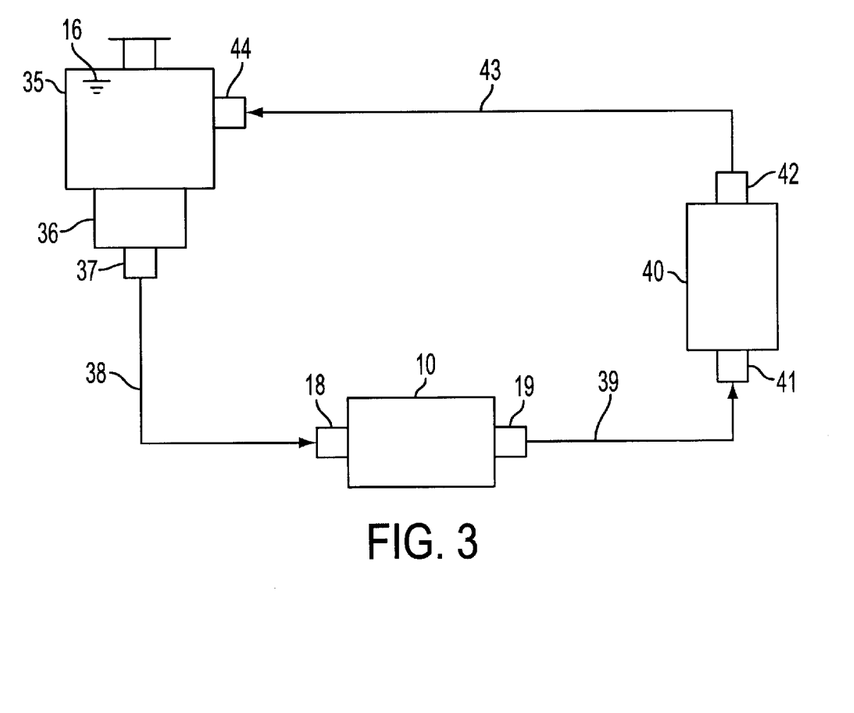
FIG. 3 is a block diagram showing a cooling system according to the first embodiment.

FIGS. 1–3 show a first embodiment of the present invention. FIG. 1 is a cross-sectional view showing a vehicle brushless AC generator. FIG. 2 is a rear view showing the positional relationship between an inlet portion 18 and an outlet portion 19, and FIG. 3 is a block diagram showing a cooling system. In FIG. 1, reference numeral 1 is a generator case, and a plate-shaped front bracket 2 and a bowl-shaped rear bracket 3 are joined in a format resembling hands clasped in prayer to form a parts housing chamber 4. The rear bracket 3 has a flange portion 5 circularly projecting outward from the periphery of its opening portion and the front bracket 2 has a circularly formed groove 6 on its rear face, wherein the flange portion 5 is fitted into the groove 6. The joint surface between the front bracket 2 and the flange portion 5 of the rear bracket 3 is located within a surface in the direction crossing a generator shaft 63. Numeral 7 denotes cooling fins provided on a cooling chamber side of a peripheral wall of the rear bracket 3. The cooling fins are spaced apart at predetermined intervals along the direction parallel to the generator shaft 63 and formed in such a manner that a plurality of fins circularly project to extend in the peripheral direction of the rear bracket 3. The cooling fins are made of the same material as the rear bracket 3 and integrally formed with the rear bracket 3 together. The front bracket 2, the rear bracket 3, the flange portion 5 and the cooling fins 7 are good heat-conducting metals such as aluminum.

Numeral 8 is a bowl-shaped cooling cover that is a size larger than the rear bracket 3. The cooling cover 8 is disposed to cover the rear bracket 3 from behind so that a flange portion 9 circularly projecting outward from the periphery of an opening portion of the cooling cover 8 overlaps the flange portion 5 of the rear bracket 3. According to this arrangement, the joint surface between the flange portion 5 and the flange portion 9 is located within a surface in the direction crossing the generator shaft 63. Numeral 10 is an airtight cooling chamber that is formed between the rear bracket 3 and the cooling cover 8 by covering the rear bracket 3 with the cooling cover 8 from behind. The cooling chamber 10 is provided with a vertical cooling portion 11 and a lateral cooling portion 12. The vertical cooling portion is positioned between a back wall of the rear bracket 3 and a front wall of the cooling cover 8, while the lateral cooling portion 12 is positioned between a peripheral wall of the rear bracket 3 cylindrically extending forward from the periphery of the vertical cooling portion 11 and a peripheral wall of the cooling cover 8.

The numeral 13 is a cooling fin provided on a cooling chamber side of the cooling cover 8 to correspond to a voltage regulator 81. Numeral 14 is another cooling fin provided on a cooling chamber side of the cooling cover 8 to correspond to a rectifier 83. These cooling fins 13 and 14 are made of the same material as the cooling cover 8 and integrally formed with the cooling cover 8. These fins 13 and 14 may be disposed to circularly project at each position on a plurality of periphery with different radius from the generator shaft 63. However, if they are formed to correspond to the voltage regulator 81 and the rectifier 83, a cooling fluid 16 as shown by dotted lines flows smoothly within the vertical cooling portion 11. Each material of the cooling cover 8 and the cooling fins 13 and 14 is a good heat conducting metal such as aluminum.

The numeral 15 is an o-ring-shaped sealing member positioned at a joint surface area between the flange portion 5 of the rear bracket 3 and the flange portion 9 of the cooling cover 8. The sealing member 15 serves to prevent the cooling fluid 16 in the cooling chamber 10 from leaking from the joint surface area between the flange portions 5 and 9. Numeral 17 is a bolt for fastening together the front bracket 2, the flange portion 5 of the rear bracket 3 and the flange portion 9 of the cooling cover 8. The bolt 17 is a fastening member for connecting the front bracket 2, the rear bracket 3 and the cooling cover 8. This fastening member may be a combination of a nut and a bolt in place of the bolt 17.

Numeral 18 is an inlet portion provided on a peripheral wall of the cooling cover 8 to communicate with the cooling chamber 10. A screw thread portion is formed at the base periphery of the inlet portion 18. A threaded hole is formed at a back wall side of the peripheral wall of the cooling cover 8. The inlet portion 18 is secured to the cooling cover 8 by tightening the screw thread portion to engage with the threaded hole. Numeral 19 is an outlet portion formed on a peripheral wall of the cooling cover 8 to communicate with the cooling chamber 10. The outlet portion 19 is secured to the cooling cover 8 by tightening a screw thread portion formed at the base periphery of the outlet portion 19 to engage with a threaded hole formed at a flange portion 9 side in the peripheral wall of the cooling cover 8.

The inlet portion 18 is arranged on the back wall side of the cooling cover 8 and the outlet portion 19 is arranged on the flange portion 9 side of the cooling cover 8. According to this arrangement, the cooling fluid 16 flows directly through the inlet portion 18 to the vertical cooling portion 11 of the cooling chamber 10 as shown by the arrow X1. The cooling fluid 16 then reaches the outlet portion 19 through the lateral cooling portion 12 from the vertical cooling portion 11 of the cooling chamber 10 as shown by the arrow X2. Thus, the cooling channel for the cooling fluid in the cooling chamber 10 is long and as a result, the cooling effect of the cooling fluid 16 on the generator is good.

In the first embodiment, elements such as the stator 60, the generator shaft 63, a front bearing 64, a rear bearing 65, a pulley 66, a rotating magnetic pole 67, an exciter 71, the voltage regulator 81, the rectifier 83, a protective cover 88, air gaps existing between the stator 60, the rotating magnetic pole 67 and the exciter 71, and a cylindrical housing portion 74 formed on the rotating magnetic pole 67 are the same as those of the prior art. However, in addition to the characteristic structure stated above, the present invention has the following special features (1) through (9) which differs from the prior art:

(1) The stator 60 is arranged, in the parts housing chamber 4, on the inner peripheral surface of the rear bracket 3 and the rotating magnetic pole 67 is press-fitted on the generator shaft 63.

(2) Numeral 20 is a bolt for controlling the movement of the stator fastened to the rear bracket 3. The head of the bolt 20 projecting toward the parts housing chamber 4 from the rear bracket 3 serves to control the movement of the stator 60. Namely, when the generator is assembled, the stator 60 is inserted into the rear bracket 3 before the front bracket 2 and the rear bracket 3 are joined together. If the front bracket 2 and the rear bracket 3 are joined in this state, there is some possibility that the stator 60 will move toward the front bracket 2. Therefore, after the stator 60 is inserted into the rear bracket 3, the bolt 20 is secured to the rear bracket 3 to control the movement of the stator 60. Thus, the bolt 20 is a stator movement control member. This stator movement control member may be a pushing member into a hole formed on the rear bracket 3 in place of the bolt 20.

(3) Numeral 21 is a good heat-conducting electrical insulating material as a silicon resin. The electrical insulating material 21 is filled through a filler opening portion 22 into a gap surrounded by the front bracket 2, the rear bracket 3, and the stator 60 and set there to fixedly support the stator 60 against the front bracket 2 and the rear bracket 3. This electrical insulating material 21 spreads over the stator coil 62 and reaches a gap between a connecting wire 24 projecting from a through-hole 23 of the rear bracket 3 to the outside of the back wall of the rear bracket 3 and and sets there. In this case, although it depends on the viscosity and filling pressure of the electrical insulating material 21 and the size of the gap, it is advisable to use stops (not shown) on the periphery of the through-hole 23 of the rear bracket 3 when applying the electrical insulating material 21, thereby preventing the molten electrical insulating material 21 being filled from leaking outside the back wall of the rear bracket 3 through the through-hole 23. Thus, the stops can be removed after the electrical insulating material has set.

(4) Numeral 25 is a bolt made of a good heat-conducting material such as aluminum. When the bolt 23 secures the exciter 71 to the rear bracket 3, the head of the bolt 25 contacts the cooling fluid 16 in the cooling chamber 10. The bolt 25 may be a heat pipe built-in structure or a heat pipe structure.

(5) Numeral 26 is an o-ring-shaped sealing member. When the bolt 25 is tightened to the exciter 71 from behind the rear bracket 3, the sealing member 26 is disposed between the head of the bolt 25 and the rear bracket 3 to prevent the cooling fluid from leaking toward the parts housing chamber 4.

(6) The voltage regulator 81 is secured to the back surface of the cooling cover 8 through two layers of a plate-shaped heat sink 27 made of a good heat-conducting metal such as aluminum and a plate-shaped heat conductor 28 made of good heat-conducting synthetic resin such as silicon resin.

(7) The rectifier 83 is secured to the back surface of the cooling cover 8 through two layers of a plate-shaped heat sink 29 made of a good heat-conducting metal such as aluminum and a plate-shaped heat conductor 30 made of a good heat-conducting synthetic resin such as silicon resin.

(8) Numeral 31 is a spacer mounted around the generator shaft 63 between the front bearing 64 and the rotating magnetic pole 67.

(9) Numeral 32 is a circular bearing keep, the inner diameter of which is larger than that of the spacer. The bearing keep 32 is secured to the parts housing chamber 4 side of the front bracket 2 by a bolt 33 to control any movement of the front bearing 64 toward the parts housing chamber 4 side.

The generating operation of the vehicle brushless AC generator according to the $_1$st embodiment when it is mounted on the automobile is the same as that of the prior art. Namely, The voltage of 3-phase AC induced electromotive force generated from a stator coil 62 is first regulated by the voltage regulator 81, then rectified by the rectifier 83 and charged through wiring from an outer terminal (not shown) into a battery.

In FIG. 2, when the AC generator according to the $1^{st}$ embodiment is mounted on the engine of the automobile, the inlet portion 18 and the outlet portion 19 are arranged in almost the same direction as the rear bracket 3 when the rear bracket 3 is seen from behind so that the inlet portion 18 and the outlet portion 19 can be located on top. This is because the cooling channel of the cooling fluid 16 in the cooling chamber 10 is the longest if the inlet portion 18 and the outlet portion 19 are situated in a straight line parallel to the generator shaft 63 when the rear bracket 3 is seen from behind. However, unless the inlet portion 18 and the outlet portion 19 are arranged in the completely reverse position, for example, in such a manner that the inlet portion 18 is arranged on the upper side and the outlet portion 19 is arranged on the lower side when the rear bracket 3 is seen from behind, the cooling channel of the cooling fluid 16 in the cooling chamber 10 is shorter than the longest channel, for example, in the peripheral direction area H. However, even in this state, the cooling fluid 16 flows smoothly from the inlet portion 18 to the outlet portion 19 within the cooling chamber 10 without any stagnation. In FIG. 2, the inlet portion 18 overlaps the outlet portion 19 when seen from behind, but the inlet portion 18 is shown as a solid line and the outlet portion 19 is shown as a dotted line for easy understanding. Also, the protective cover 88 is omitted from the drawing.

In FIG. 3, numeral 35 is a tank for storing the cooling fluid 16 and numeral 36 is a pump for pumping out the cooling fluid 16 stored in the tank 35. Numeral 37 is an outlet portion; 38 a pipe connecting the outlet portion 37 to the inlet portion 18 of the cooling chamber 10; 39 a pipe connecting the outlet portion 19 of the cooling chamber 10 to an inlet portion 41 of a radiator 40; and 43 a pipe connecting an outlet portion 42 of the radiator 40 to a returning inlet portion 44 of the tank 35. Therefore, in the condition that the cooling fluid 16 is stored in the tank 35, when the pump 36 is driven by either a motor operated by electric power from the automobile battery or the engine (through a belt), the cooling fluid 16 flows through the tank 35, the pump 36, the outlet portion 37, the pipe 38, the inlet portion 18, the cooling chamber 10, the outlet portion 19, the pipe 39, the inlet 41, the radiator 40, the outlet 42, the pipe 43, and the returning inlet portion 44, in order, then returns to the tank 35. In this circulating process of the cooling fluid 16, the cooling fluid 16 absorbs, by heat exchange, the heat generated from the parts such as the stator 60, the rotating magnetic pole 67, the exciter 71, the voltage regulator 81 and the rectifier 83 by the generating operation. Then, the heat-absorbed cooling fluid 16 radiates heat by heat exchange in the radiator 40 and is cooled.

According to a $_1$st aspect of the present invention, since the cooling chamber 10 is formed completely separated from the parts housing chamber 4, outside the generator case 1, by two separate parts of the rear bracket 3 and the cooling cover 8, the cooling function portion utilizing the cooling fluid 16 can be made simple.

According to a $2^{nd}$ aspect of the present invention, the bowl-shaped rear bracket 3 is joined, in the same direction, with the bowl-shaped cooling cover 8 that is a size larger than the rear bracket 3, and the flange portion 5 of the rear bracket 3 overlaps the flange portion 9 of the cooling cover 8. Thus, the joint surface between the two flange portions 5 and 9 is located in the direction crossing the generator shaft 63 and the airtight cooling chamber 10 is formed between the rear bracket 3 and the cooling cover 8. The sealing member 15 is disposed at the joint surface area between the two flange portions 5 and 9 and these two flange portions 5 and 9 are connected by the bolt 17 outside and in a radial direction from the sealing member 15. Thus, additional sealing members for preventing leakage of the cooling fluid 16 can be omitted from the periphery of the bolt 17 and, as a result, simple construction is realized.

According to a $3^{rd}$ aspect of the present invention, since the generator case 1 is formed by the good heat-conducting material, the heat generated from the parts such as the stator 60, the rotating magnetic pole 67 and the exciter 71 housed in the parts housing chamber 4 is radiated outside through the generator case 1. Particularly, since the rear bracket 3 serves to form a part of the cooling chamber 19, it is possible to improve the cooling effect by the cooling fluid 16 flowing inside the cooling chamber 10.

According to a $4^{th}$ aspect of the present invention, since the cooling cover 8 is formed by the good heat-conducting material, the heat generated from the parts such as the voltage regulator 81 and the rectifier 83 arranged on the cooling cover 8 can be effectively radiated through the cooling cover 8 to the cooling fluid 16 flowing inside the cooling chamber 10.

According to a $5^{th}$ aspect of the present invention, although the sealing member 26 is needed between the rear bracket 3 and the head of the bolt 25, the head of the bolt 25 is arranged to contact the cooling fluid 16 flowing inside the cooling chamber 10. It is therefore possible for the heat generated from the exciter 71 to effectively radiate through the rear bracket 3 and the bolt 25 to the cooling fluid 16 flowing inside the cooling chamber 10.

According to a 6$^{th}$ aspect of the present invention, since the stator 60 is supported through the good heat-conducting electrical insulating material 21 to the front bracket 2 and the rear bracket 3, the heat generated from the stator 60 can be effectively radiated through the front bracket 2 and the rear bracket 3.

According to a 7$^{th}$ aspect of the present invention, since the cooling fin 7 is formed on the cooling chamber side of the peripheral wall in the rear bracket 3, the heat generated from the stator 60 can be effectively radiated through the rear bracket 3 and the cooling fin 7 to the cooling fluid 16 flowing inside the cooling chamber 10.

According to an 8$^{th}$ aspect of the present invention, since the cooling fin 7 is circularly formed to extend in the peripheral direction of the rear bracket 3, it can serve as a guide to cause the cooling fluid 16 to flow toward the outlet portion 19 from the lower side to the lateral cooling portion 11 and as a result, the cooling fluid 16 flows smoothly from the lower side of the lateral cooling portion 11 toward the outlet portion 19, thereby improving the heat exchange by the cooling fluid 16.

According to a 9$^{th}$ aspect of the present invention, since the cooling fin 13 is disposed to correspond to the voltage regulator 81, the cooling fin 14 is disposed to correspond to the rectifier 83, and both cooling fins 13 and 14 are disposed on the cooling chamber side of the cooling cover 8, the heat generated from the voltage regulator 81 and the rectifier 83 can be effectively radiated through the cooling cover 8 and the cooling fins 13 and 14 to the cooling fluid 16 flowing inside the lateral cooling portion 11.

According to a 10$^{th}$ aspect of the present invention, since the voltage regulator 81 is secured to the cooling cover 8 through the layers of the good heat-conducting heat sink 27 and the good heat-conducting heat conductor 28, the heat generated from the voltage regulator 81 can be effectively conducted to the cooling cover 8.

According to an 11$^{th}$ aspect of the present invention, since the rectifier 83 is secured to the cooling cover 8 through the layers of the good heat-conducting heat sink 29 and the good heat-conducting heat conductor 30, the heat generated from the rectifier 83 can be effectively conducted to the cooling cover 8.

According to a 12$^{th}$ aspect of the present invention, since the flange portion 5 of the rear bracket 3 and the flange portion 9 of the cooling cover 8 are fitted into the groove 6 of the front bracket 2, the positioning of the front bracket 2 and the rear bracket 3 is fixed and the positioning of the rear bracket 3 and the cooling cover 8 is also fixed, so they are easily assembled.

According to a 13$^{th}$ aspect of the present invention, as shown in FIG. 3, since the cooling chamber 10 is connected to a different cooling system from the engine cooling fluid system of the automobile, having at least the tank 35 and the radiator 40, the cooling of the generator has nothing to do with that of the engine and it is possible to cool each of them properly.

2$^{nd}$ Embodiment

Figure 4:
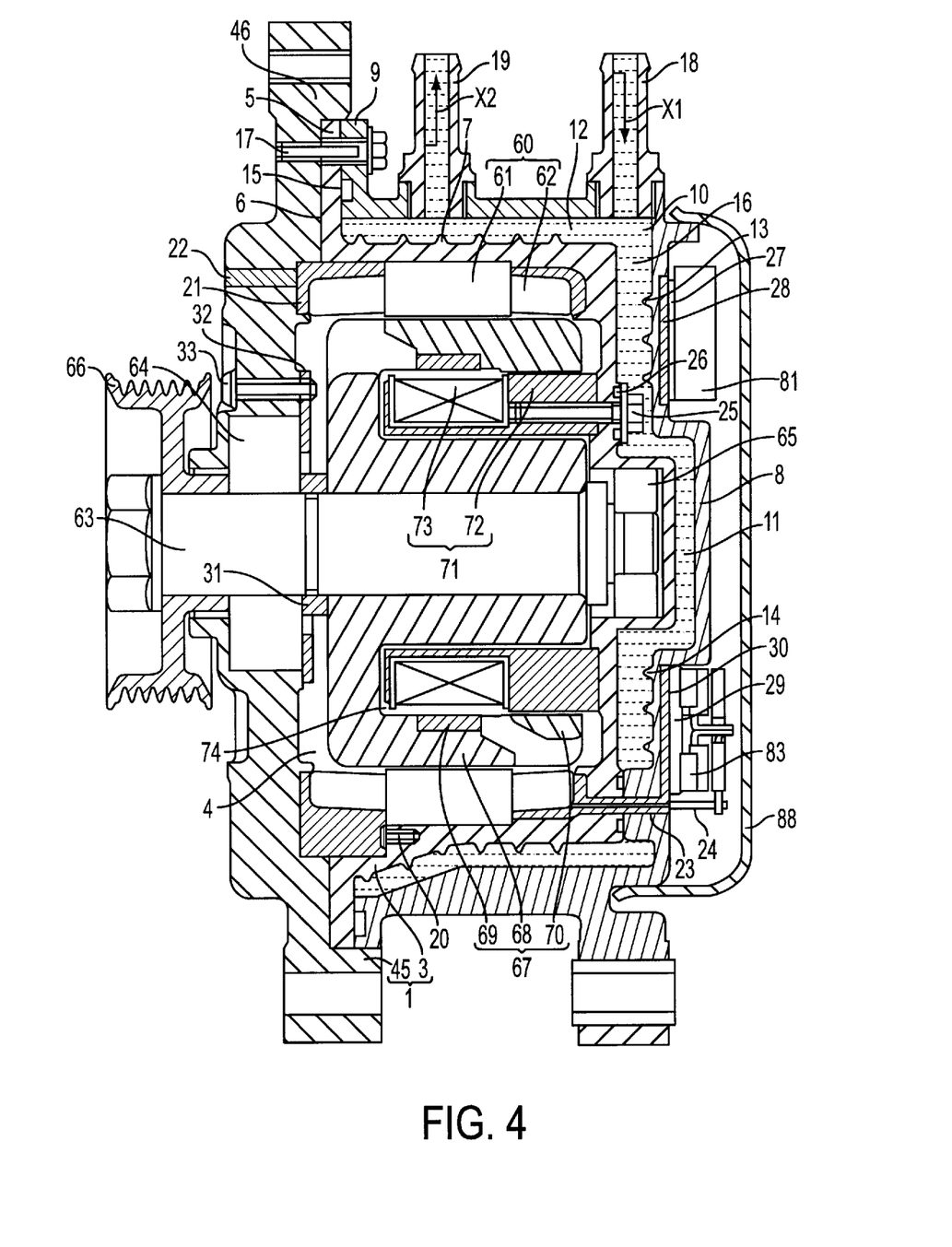
FIG. 4 is a cross-sectional view showing a second embodiment of the AC generator according to the present invention.

In the 1$^{st}$ embodiment, the front bracket 2 is formed in a plate shape, but as shown in FIG. 4, a front bracket 45 can be formed in a bowl shape for the same application. FIG. 4 is a cross-sectional view showing a 2$^{nd}$ embodiment of the vehicle brushless AC generator according to the present invention. In FIG. 4, a flange portion 46 projecting outward from the periphery of an opening portion in the front bracket 45 is joined with the flange portion 5 of the rear bracket 3 in a format resembling hands clasped in prayer to form the parts housing chamber 4 between the front bracket 45 and the rear bracket 3. The joint surface area of the flange portion 5 with the flange portion 46 is located within the surface in the direction crossing the generator shaft 63. The front bracket 45 and the flange portion 46 are good heat-conducting metals such as aluminum. Therefore, since the front bracket 45 is formed in a bowl shape, the size of the lateral cooling portion 12 in the direction parallel to the generator shaft 63 is smaller than in the 1$^{st}$ embodiment. However, since the front bracket 2 is formed by the good heat-conducting material, the front bracket 45 can effectively radiate the heat conducted from the parts housing chamber 4 side through the flange portion 46, the flange portion 5, and the rear bracket 3, in order, to the cooling fluid 16 flowing into the cooling chamber 10.

As mentioned above, according to the present invention, the bowl-shaped rear bracket forms the parts housing chamber together with the front bracket. The bowl-shaped cooling cover is arranged to cover the rear bracket in the same direction. The rear bracket is provided at its opening portion with the flange portion which overlaps the opening portion of the cooling cover to form the cooling chamber between the rear bracket and the cooling cover in a manner completely separated from the parts housing chamber. Thus, the cooling chamber can be formed with two parts of the rear bracket and the cooling cover and the cooling function portion utilizing the cooling fluid can be formed as a simple structure.

According to claim 2 of the present invention, the front bracket has a groove into which the flange portion of the rear bracket is fitted. According to this construction, the positioning of the front bracket and the rear bracket is determined and assembly is easy.

According to claim 3 of the present invention, a sealing member is disposed at the joint surface area of the flange portion of the cooling cover with the flange portion of the rear bracket. Since these flange portions and the front bracket have been connected by a fastening member outside the sealing member, it is no more necessary to provide additional sealing members for preventing the leakage of the cooling fluid on the periphery of the fastening member, therefore simple construction can be realized.

According to claim 4 of the present invention, the front bracket has a groove into which the flange portion of the rear bracket and the flange portion of the cooling cover are fitted. With this arrangement, positioning of the front bracket, the rear bracket and the cooling cover is determined and assembly is simplified.

According to claim 5 of the present invention, since the front bracket, the rear bracket and the cooling cover are formed from good heat-conducting materials, the heat generated from the generating parts housed in the parts housing chamber can be effectively radiated through those good heat conducting materials from the parts housing chamber to the outside of the equipment. With this construction, the generating parts are properly cooled and it helps prolong the life of the generating parts.

According to the present invention, since the stator is supported through a good heat-conducting electrical insulating material to the rear bracket, the heat generated from the stator can be effectively conducted through the electrical insulating material and the rear bracket to the cooling fluid in the cooling chamber.

According to the present invention, since the good heat-conducting electrical insulating material has been filled into and set in a gap between the stator and the rear bracket, the electrical insulating material can spread to every corner of the gap, compared with inserting a solid electrical insulating material into the gap between the stator and the rear bracket, and it can also effectively conduct the heat generated from the stator to the rear bracket.

According to the present invention, since the good heat-conducting electrical insulating material is filled through a filler opening portion formed on the front bracket to the gap between the front bracket, the rear bracket and the stator and sets there, it can effectively conduct the heat generated from the stator to the front and rear brackets.

According to the present invention, since the voltage regulator is secured through a good heat-conducting sheet to the surface of the cooling chamber opposite the cooling chamber, the heat generated from the voltage regulator can be effectively radiated through the sheet and the cooling cover to the cooling fluid in the cooling chamber, even if the voltage regulator is covered by a protective cover and electrical safety is secured.

According to the present invention, since the rectifier is secured through a good heat-conducting sheet to the surface of the cooling chamber opposite the cooling chamber, the heat generated from the rectifier can be effectively radiated through the sheet and the cooling cover to the cooling fluid in the cooling chamber.

According to the present invention, since the exciter is secured to the rear bracket by a good heat-conducting fastening member, the heat generated from the exciter can be effectively radiated through the fastening member and the rear bracket to the cooling fluid in the cooling chamber.

According to the present invention, since a part of the good heat-conducting fastening member securing the exciter to the rear bracket is exposed in the cooling chamber, the heat generated from the exciter can be effectively radiated through the fastening member to the cooling fluid in the cooling chamber.

According to the present invention, since the cooling fin is provided on a cooling chamber side of the rear bracket, the heat generated from the generating parts housed in the parts housing chamber can be effectively radiated through the cooling fin of the rear bracket to the cooling fluid in the cooling chamber.

According to the present invention, since the cooling fin is circularly formed along the peripheral direction of the rear bracket, it can serve to guide the flow of the cooling fluid in the cooling chamber in the predetermined direction and the flow improves the heat exchange by the cooling fluid.

According to the present invention, since the cooling fin is provided on a cooling chamber side of the cooling cover, the heat exchange effectiveness of the cooling cover with the cooling fluid improves.

According to the present invention, since the cooling fin is provided to correspond to the rectifier secured to the surface of the cooling cover opposite the cooling chamber, the heat generated from the rectifier can be effectively radiated through the cooling cover and the cooling fin to the cooling fluid in the cooling chamber.

According to the present invention, since the cooling fin is provided to correspond to the voltage regulator secured to the surface of the cooling cover opposite the cooling chamber, the heat generated from the voltage regulator can be effectively radiated through the cooling cover and the cooling fin to the cooling fluid in the cooling chamber.

According to the present invention, since the cooling cover is provided on the same side with the inlet portion for introducing the cooling fluid into the cooling chamber and the outlet portion for discharging the cooling fluid from the cooling chamber, when the generator is mounted on a vehicle such as an automobile or a motorbike, it is advisable to install the generator so that the inlet portion and the outlet portion are located on top. With this arrangement, even if the flow of the cooling fluid stops as a result of the vehicle engine stopping, the cooling chamber is full of the cooling fluid and there is no possibility that an air layer will be generated in the cooling chamber. Thus, this construction prevents air from mixing with the cooling fluid flow upon restarting the engine and also prevents cooling malfunction of the cooling fluid resulting from air inclusion.

According to the present invention, since the cooling chamber is connected to a different cooling system from an engine cooling system of the vehicle, having at least a tank and a radiator, the cooling of the generator has nothing to do with the cooling of the engine, therefore it is possible to cool each of them properly. Also, since the cooling system of the generator is now provided with at least a tank and a radiator, the tank is used to replenish the cooling chamber with the cooling fluid. For example, when the AC generator is mounted on the automobile, it is possible, in a small engine chamber, to situate the tank at the most suitable position for replenishment and situate the radiator at the most suitable position for radiation in coexistence with other vehicle parts than the generator.

What is claimed is:

1. A vehicle brushless AC generator having a cooling function utilizing a cooling fluid, comprising
    a front bracket;
    a bowl-shaped rear bracket, having a flange portion projecting outward from an opening of said rear bracket:
    a parts housing chamber formed by connecting the front bracket with the flange portion of the rear bracket, said housing chamber being adapted to house generating parts comprising a generator shaft, a stator, a rotating magnetic pole and an exciter; and
    a bowl-shaped cooling cover disposed over the rear bracket and connected to the rear bracket by a flange portion projecting outward from an opening of said cooling cover to form an airtight cooling chamber between an exterior surface of the rear bracket and an interior surface of the cooling cover,
    and wherein the front bracket includes a circular groove adapted to receive the flange portion of said rear bracket and the flange portion of the cooling cover.

2. A vehicle brushless AC generator according to claim 1, wherein the front bracket is provided with a circular groove adapted to engage with the flange portion of the rear bracket.

3. A vehicle brushless AC generator according to claim 1, wherein the cooling cover flange portion is provided with a sealing member disposed at a joint surface area where the flange portion of the cooling cover and the flange portion of the rear bracket contact each other, and wherein said cooling cover flange portion and said rear bracket flange portion connect to the front bracket by a fastening member.

4. A vehicle brushless AC generator according to claim 1, wherein the front bracket, the rear bracket and the cooling cover are formed from a good heat-conducting material.

5. A vehicle brushless AC generator according to claim 1, wherein a good heat-conducting electrical insulating material supports the stator located in the rear bracket.

6. A vehicle brushless AC generator according to claim 5, wherein the electrical insulating material is filled and set in a gap formed between the stator and the rear bracket.

7. A vehicle brushless AC generator according to claim 1, wherein a filler opening is located in the front bracket to receive an electrical insulating material which sets in a gap formed between the front bracket, the rear bracket and the stator.

8. A vehicle brushless AC generator according to claim 1, wherein a voltage regulator is secured to a surface of the cooling chamber, located opposite the cooling chamber from the parts housing chamber, by a sheet with good heat conduction.

9. A vehicle brushless AC generator according to claim 1, wherein a rectifier is secured to a surface of the cooling chamber, located opposite the cooling chamber from the parts housing chamber, by a sheet with good heat conduction.

10. A vehicle brushless AC generator according to claim 1, wherein the exciter is secured to the rear bracket by a good heat-conducting fastening member.

11. A vehicle brushless AC generator according to claim 10, wherein a part of the fastening member is exposed to the cooling chamber.

12. A vehicle brushless AC generator according to claim 1, wherein a cooling fin is provided on a surface of the rear bracket which contacts the cooling chamber.

13. A vehicle brushless AC generator according to claim 12, wherein the cooling fin is formed along a peripheral surface of the rear bracket.

14. A vehicle brushless AC generator according to claim 1, wherein a cooling fin is provided on a cooling chamber side of the cooling cover.

15. A vehicle brushless AC generator according to claim 14, wherein the cooling fin is provided on a surface of the cooling cover opposite a rectifier and protrudes into the cooling chamber.

16. A vehicle brushless AC generator according to claim 14, wherein the cooling fin is provided on a surface of the cooling cover opposite a voltage regulator and protrudes into the cooling chamber.

17. A vehicle brushless AC generator according to claim 1, wherein the cooling cover is provided with an inlet portion for introducing the cooling fluid into the cooling chamber and an outlet portion for discharging the cooling fluid from the cooling chamber, respectively.

18. A vehicle brushless AC generator according to claim 1, wherein the cooling chamber is part of a separate cooling system from an engine cooling system of the vehicle, and has at least a tank and a radiator.

* * * * *